(12) United States Patent
Bengtson

(10) Patent No.: US 8,020,021 B2
(45) Date of Patent: Sep. 13, 2011

(54) TWO GLOBAL PRECISE TIMES FOR SYNCHRONIZATION

(75) Inventor: John Bengtson, Hojbjerg (DK)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 12/787,229

(22) Filed: May 25, 2010

(65) Prior Publication Data

US 2010/0299550 A1 Nov. 25, 2010

Related U.S. Application Data

(60) Provisional application No. 61/184,176, filed on Jun. 4, 2009.

(30) Foreign Application Priority Data

May 25, 2009 (DK) .................................. 2009 00652

(51) Int. Cl.
*G06F 15/177* (2006.01)
*G06F 1/12* (2006.01)
*G06F 1/04* (2006.01)
*G06F 15/16* (2006.01)

(52) U.S. Cl. ............ 713/375; 713/2; 713/400; 713/502; 713/503

(58) Field of Classification Search .............. 713/2, 400, 713/502, 503, 375
See application file for complete search history.

(56) References Cited

U.S. PATENT DOCUMENTS

| 5,293,626 | A | * | 3/1994 | Priest et al. | 713/401 |
| 5,682,328 | A | * | 10/1997 | Roeber et al. | 702/187 |
| 7,188,060 | B1 | * | 3/2007 | Adcock | 703/14 |
| 2002/0029097 | A1 | | 3/2002 | Pionzio, Jr. et al. | |
| 2008/0068103 | A1 | * | 3/2008 | Cutler | 331/74 |
| 2009/0128402 | A1 | | 5/2009 | Altenschulte | |
| 2010/0274399 | A1 | * | 10/2010 | Sadaba et al. | 700/287 |

FOREIGN PATENT DOCUMENTS

| WO | 2009068034 A1 | 6/2009 |
| WO | 2010136042 A1 | 12/2010 |

OTHER PUBLICATIONS

Gehrke et al. "Building a test platform for agents in power system control: Experience from SYSLAB". Nov. 2007.

(Continued)

*Primary Examiner* — Vincent T Tran
(74) *Attorney, Agent, or Firm* — Patterson & Sheridan, LLP

(57) ABSTRACT

Method of controlling a wind power system comprising a plurality of system elements, the wind power system including a plurality of data processors distributed in the system elements, the method includes the steps of: synchronizing at least a part of the data processors to at least one reference signal distributed to the data processors from a time synchronization arrangement, associating the data processors with local clock generation circuitries, wherein the local clock generation circuitries associated with data processors of a first subset of the data processors have a peak-to-peak tracking jitter higher than or equal to a predetermined threshold value and wherein a second subset of the data processors have a peak-to-peak tracking jitter less than the predetermined threshold value, controlling at least one of said system elements at least partly by mechanism of a data processor from said first or second subset of data processors.

17 Claims, 6 Drawing Sheets

OTHER PUBLICATIONS

Gaderer et al. "Clock synchronization in powerline networks". Apr. 2005.

International Search Report; PCT/DK2010/050112; Jan. 12, 2011; 3 pages.

Serizawa et al. "SDH-Based Time Synchronous System for Power System Communications". Jan. 1998.

Luan et al. "Suppression of Jitter Accumulation in MS Synchronization networks with multiply detecting and averaging synchronizers". Oct. 1988.

Ozansoy et al. "Time synchronisation in a IEC 61850 based substation automation system". Dec. 2008.

Danish Technical Examination No. 1; Application No. PA 2009 00652; Jan. 6, 2010; 3 pages.

Danish Search Report; Application No. PA 2009 00652; Dec. 22, 2009; 1 page.

Alonso, et al.; "Industrial Control System for a Back-to-Back Multilevel NPC Converter based on DSP and FPGA"; Industrial Electronics; Jun. 2007; 6 pages.

* cited by examiner

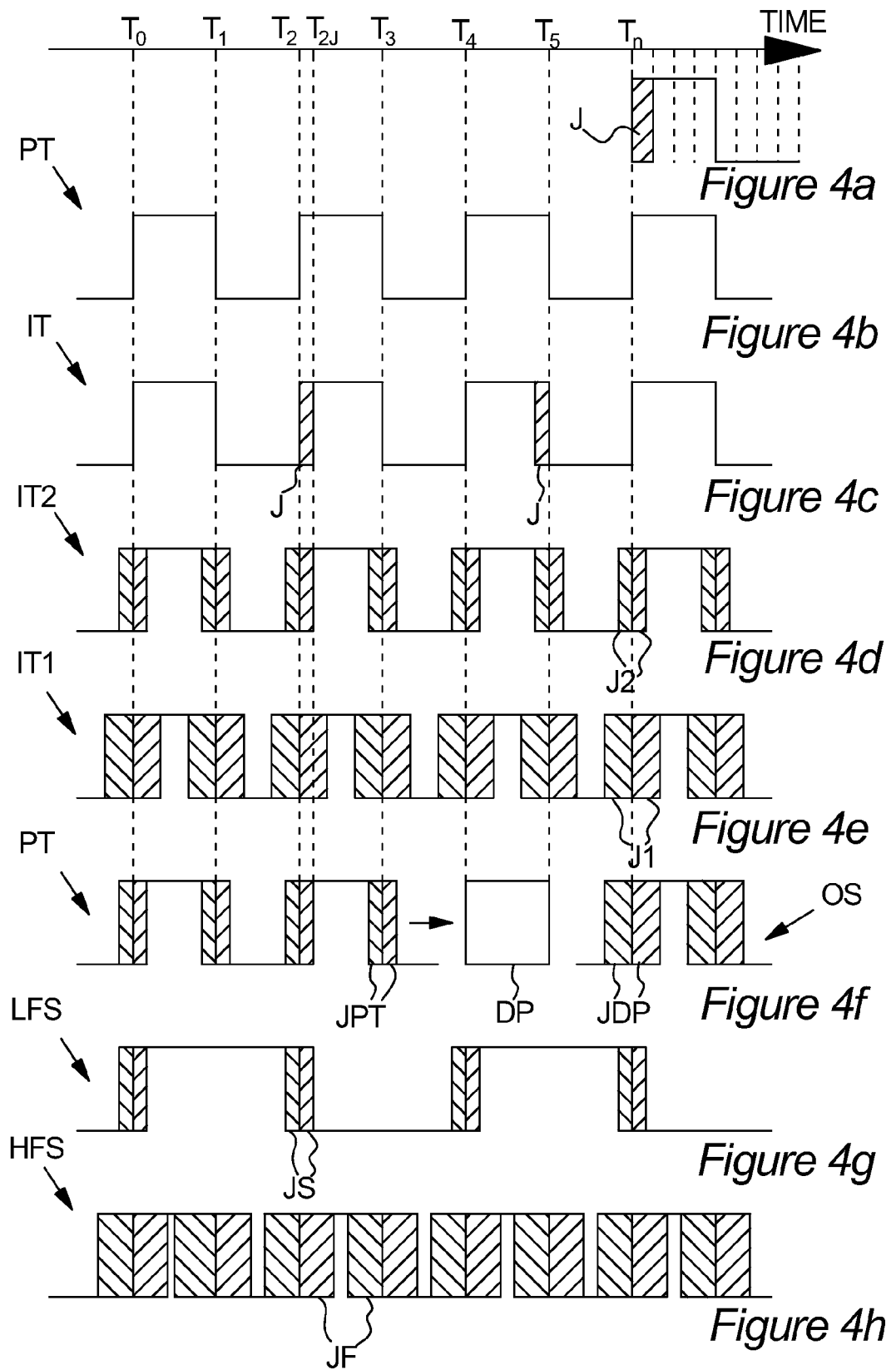

TWO GLOBAL PRECISE TIMES FOR SYNCHRONIZATION

CROSS-REFERENCE TO RELATED APPLICATIONS

The present application claims priority from Danish patent application PA 2009 00652 filed on May 25, 2009. In addition, the present application claims the benefit under 35 U.S.C. §119 (e) of the U.S. Provisional Patent Application Ser. No. 61/184,176 filed on Jun. 4, 2009. The content of all prior applications is incorporated herein by reference.

FIELD OF THE INVENTION

The invention relates to a method of and system for controlling a wind power system.

BACKGROUND OF THE INVENTION

Wind power system monitoring, control and regulation data is often correlated in the time domain. Over recent years the performed monitoring, control and regulation in wind power systems have become increasingly more sophisticated and as a consequence requirements to data processing speed, precision and reliability in data communication and in relation to the temporal correlation of data have increased. Consequently, requirements e.g. to precision in the time domain of a wind power system have increased.

SUMMARY OF THE INVENTION

The invention relates to a method of controlling a wind power system comprising a plurality of system elements, said wind power system including a plurality of data processors distributed in said system elements, the method comprising the steps of:
- synchronizing at least a part of said data processors to at least one reference signal distributed to said data processors from a time synchronization arrangement,
- associating said data processors with local clock generation circuitries
- wherein said local clock generation circuitries associated with data processors of a first subset of the data processors have a peak-to-peak tracking jitter higher than or equal to a predetermined threshold value,
- wherein said local clock generation circuitries associated with data processors of a second subset of the data processors have a peak-to-peak tracking jitter less than said predetermined threshold value,
- controlling at least one of said system elements at least partly by means of a data processor from said first subset of data processors susceptible to the jitter of the local clock generation circuitry associated with the data processor from the first subset of data processors, and
- controlling at least one of said system elements at least partly by means of a data processor from said second subset of data processors on the basis of said at least one reference signal while being susceptible to the jitter of the local clock generation circuitry associated with the data processor from the second subset of data processors,
- thereby utilizing said second subset of data processors for high precision control in the wind power system.

Hereby high precision control of individual system elements or parts of system elements of a wind power system is possible. System elements such as a plurality of wind turbines and substations of a wind power plant is controlled based on a plurality of data processors, according to the invention a subset of these data processors are high precision data processors and are synchronized to a precise time reference. This enables very precise control of this subset of data processors and thereby also of parts of the individual wind turbines and substations. Such high precision control could e.g. be control of power output of the individual wind turbines. Because the output of the individual wind turbines and substations in a wind power plant is controlled precise and synchronous, a central park controller can control the total power output from the wind power plant and thereby the wind power plant is able to support the utility grid, if a fault occurs in relation to the utility grid.

In other words according to the invention high precision control of the wind power system can be performed disregarding data processors which are not capable of complying with high precision control instructions.

The system elements comprised in the wind power system may according to the invention e.g. be understood as elements of a wind power plant or elements communicating with a wind power plant. Hence system elements may e.g. be wind turbines, substations, controllers located internal or external in relation to the wind power plant, communication units for communicating internally within the wind power plant or from the wind power plant to external communication units.

Whether the system elements are communicating, controlling or processing data, the system elements may comprise one or more data processors, and the data processors are distributed in the system elements according to the individual tasks and implementations of the system elements.

It should be noted that not all system element comprises data processors, an example could be a metrological station only including a temperature or wind measuring unit.

Throughout this description reference signal may also be referred to as precise time. Reference signal or precise time comprises an absolute or relative representation of time in a time domain with a certain precision. Hence a high precision reference signal is accurate with a minimum of jitter enabling the internal time of a plurality data processors to be synchronous with the time domain.

Jitter can be measured in a number of ways, relative to absolute time, another signal or the output clock itself. The first is commonly referred to as absolute jitter or long-term jitter, the second as tracking jitter or input-to-output jitter, when the other signal is the reference signal. If the reference signal is perfectly periodic such that it has no jitter, absolute jitter and tracking jitter for the output signal are equivalent. The third measurement, relative to the output clock, is often called periodic, or cycle-to-cycle, jitter. Cycle-to-cycle jitter can be measured as the time-varying deviations in the period of single clock cycles, or in the width of several clock cycles (referred to as cycle-to-Nth-cycle jitter).

In the claims jitter is meant to be understood as "tracking jitter" but evidently other definitions of jitter and corresponding ways of measuring such jitter are also within the scope of the invention. Allowed peak-to-peak jitter is understood as the maximum allowed time measured between a first and a second transition e.g. in a clock signal, hence 0.5 microsecond peak-to-peak jitter may also be referred to as ±0.25 microsecond jitter, measured from the ideal time of the transition.

The reference signal may e.g. be distributed by means of a data communication network e.g. the same data communication network also used for communicating control and measuring data or distributed by a separate network or wiring.

The reference signal may be transmitted through air e.g. in a wireless network, or through cables e.g. made of cobber, fibers, etc. Furthermore the reference signal may also be derived from a GPS signal.

According to the invention said data processor communicates with a clock generation circuitry to obtain an internal tick or internal clock based on which the data processor processes data. The clock generation circuitry may be located internally within the data processor or externally to the data processor.

According to the invention, the power output from a wind turbine may be controlled with a precision enabling a control of the total power output from a wind power plant to support the utility grid if needed. The support may be in form of increased delivery of reactive power and is possible because the individual wind turbines are capable of reacting promptly and precisely e.g. on grid faults or coupling in of large electrical motors from consumers of the grid. Thereby, the number of conventional energy power plants to support the grid due to varying output from a wind power plant may be decreased.

Furthermore the establishing of a precise time enables communication on the data communication network to be based on time trigged communication protocols, thereby establish communication protocols with guaranteed latencies, enabling critical real-time control of e.g. power converters via the data communication network.

In an embodiment of the invention said second subset of data processors are utilized for high precision control of power converters of energy storage devices of the wind power system.

Hereby it becomes possible to perform a precise control of accumulation of energy produced e.g. by a wind power plant. Accumulation of energy could e.g. be in form of compressed air, batteries, etc.

Furthermore it becomes possible to shape the power output from an energy storage device, which is advantageous e.g. in situations where the wind turbines are not producing energy e.g. due to low wind speed. In such a situation it is possible for an energy storage to deliver energy to the grid and because of the high precision control of the power converter of the storage device, the power output form the energy storage can be shaped to comply with demands from the grid.

In an embodiment of the invention said second subset of data processors are utilized for high precision control of power converters of wind turbines and substations of the wind power system.

Hereby high precision control of the power converters enables the wind turbine controller or substation controller to shape the power output. Shaping the power output can be in form of changing the frequency, phase angle, voltage, etc in the sinusoidal power output from the wind turbine.

Furthermore it becomes possible to shape the power output of wind turbines and substations synchronous across the entire wind power plant.

Furthermore it is advantageous to control the power converters of system elements, when the power converters are precisely synchronized to the precise time PT, both in terms of power output waveforms and in terms of phase displacement of pulse width modulation outputs controlling the switches of the power converters.

In an embodiment of the invention said high precision control of power converters enables the wind turbine controllers and substation controllers to adjust the phase of their pulse width modulators relatively to the reference signal.

In case the transition of switches of the power converters are controlled by means of pulse width modulation, the pulse width modulators controlling the power converters switches may according to the present invention be controlled synchronously according to the reference signal.

This is advantageous because it enables control of power output from the individual wind turbines and substations and thereby it becomes possible to reduce e.g. white noise and harmonics in power output from the wind power plant. One way of implementing this, could be to control the output from a first wind turbine to compensate noise or harmonics originated from second wind turbine.

Furthermore the synchronous control of power switching internally in a wind turbine is advantageous because the synchronous control may contribute to simpler filtering of power output e.g. from the wind turbine.

The high precision control of the power converters may be performed based on at least one operational value in the utility grid e.g. voltage, phase angle, frequency, etc.

In an embodiment of the invention said second subset of data processors are utilized for high precision control of data acquisition within the wind power system.

Data acquisition may e.g. comprise measurements or sampling of data obtained within the wind power system including the grid. The present invention enables measurements from data processors of the second subset to be made e.g. with a very precise time stamp, at a synchronous time in a plurality of system elements, etc.

Furthermore it is very advantageous to use the high precision data acquisition, e.g. within a wind turbine or substation, in relation to condition monitoring. Then conditioning monitoring measurements made or controlled by different data processors with reference to the precise time may be sampled and/or correlated, facilitating a very sophisticated picture of the condition of measured element.

The utility grid may be an element of the wind power system. The utility grid is connected to the wind power plant in a point of common connection and in or through the point of common connection high precision measurements of utility grid operational values can be made. These operational values may e.g. be characteristics of voltage, frequency, phase angle, etc. and used as basis for high precision control of power converters in the wind power system.

According to the invention it is possible to perform synchronous data acquisition across elements of a wind power plant and across data processors of a wind turbine or substation. Furthermore the present invention enables high precision data acquisition of power grid events, lightning event, condition monitoring, etc.

In an embodiment of the invention said predetermined threshold value being selected in the range of 0.1 microseconds to 10 microseconds, preferably in the range of 0.1 microsecond to 2 microseconds and most preferably in the range of 0.35 microseconds to 0.65 microseconds.

Relating to the ranges of threshold values mentioned above the preferred threshold value in some elements e.g. control or monitor units of the wind power system would be 0.1 microsecond and the preferred threshold value at wind power system level e.g. between wind turbines and substations in a wind power system would be 1 microsecond.

Hereby is obtained that internal time of the data processors of the second subset of data processors is synchronous within the specified range, enabling high precision control, data acquisition, etc. This range is preferred to define allowable jitter in a square wave form signal and the selected threshold value is depending on the frequency of the internal time of the data processors.

In an embodiment of the invention the local clock generation circuitries associated with data processors of the first subset of the data processors have a peak-to-peak cycle-to-cycle jitter higher than or equal to a percentage predetermined threshold value and wherein the local clock generation circuitries associated with data processors of the second subset of the data processors have a peak-to-peak cycle-to-cycle jitter less than said percentage predetermined threshold value, Hereby it becomes possible to perform high precision control to a subset of data processors while control of a further subset of data processors is not high precision control. This enables a central controller of the wind power plant to perform differentiated control of the wind turbines and substations in a wind turbine plant and thereby the full potential of wind turbines and substations having high precision data processors is utilized.

In an embodiment of the invention said data processor is part of a wind turbine controller, substation controller or a central controller of a wind power plant.

In an embodiment of the invention a time represented by said reference signal is precise to the nearest microsecond.

The reference signal could e.g. be a square wave signal with a frequency of 1 Mhz. Jitter in the reference signal in form of a square wave signal is preferably insignificant compared to jitter in the local clock generating circuitries.

The reference signal is a precise time signal originated from a time synchronisation arrangement located internal or external to the wind power plant. The precise time signal, also in this description referred to as precise time, represents a precise time domain to which data processors may be synchronized.

The reference signal is a precise time signal and is global in the sense that it is distributed to all or at least a subset of all elements of the wind power system and creating a global precision time within the wind power system. It is therefore possible for all or for a subset of all data processors of the wind power system to refer to the precise time signal; hence the data processors which refer to the reference signal thereby become synchronized.

In an embodiment of the invention a data processor from said first subset of the data processors is synchronized to a derivative of said reference signal.

Hereby is obtained that a derivative of the reference signal may e.g. be derived by frequency division and used for synchronizing data processors of said first subset of data processors that are less demanding or less able regarding precision. Thereby it is possible to use the same reference signal for all data processors regardless of their demands.

In an embodiment of the invention said reference signal being generated by one or more clock generating units comprised by said time synchronization arrangement, and wherein said time synchronization arrangement thereby forms a fault-tolerant network ecosystem.

The fault-tolerant network ecosystem may comprise one or more time synchronization arrangements. Such time synchronization arrangements may comprise clusters of clock generation units or circuitries generating a reference signal in mutual cooperation. Hence if one clock generating unit fails another clock generating unit of the cluster continues to generate the reference signal. In this way a time synchronization arrangement is still capable of producing a reference signal if one clock generating unit fails.

In the same way if the network ecosystem e.g. comprises two or more time synchronization arrangements the network ecosystem becomes fault-tolerant i.e. if one of these time synchronization arrangements fails another time synchronization arrangement continues to produce and distribute the reference signal in the network ecosystem.

It should be mentioned that by introducing redundancy in the network ecosystem the fault-tolerance in the network ecosystem may be increased as described below.

In an embodiment of the invention said predetermined threshold value being selected in the range of 0.1 microsecond to 1 microsecond.

In an embodiment of the invention said percentage predetermined threshold value being selected in the range of 0.1% to 10%, preferably in the range of 0.2% to 3% and most preferably in the range of 0.5% to 1.5% of the period of a clock generated by said local clock generation circuitries.

Hereby is obtained that internal time of the data processors of the second subset of data processors is synchronous within the specified range, enabling high precision control, data acquisition, etc. This range is preferred to define allowable jitter in a square wave form signal and the selected threshold value is depending on the frequency of the internal time of the data processors.

Moreover the invention relates to a system for carrying out the methods described above.

BRIEF DESCRIPTION OF THE DRAWINGS

FIGS. 3c and 3d illustrate a data communication within a wind power plant according to a further embodiment of the invention and FIG. 4 illustrates precision in relation to data communication within a wind power system according to various embodiments of the invention.

DETAILED DESCRIPTION OF THE INVENTION

Figure 1:
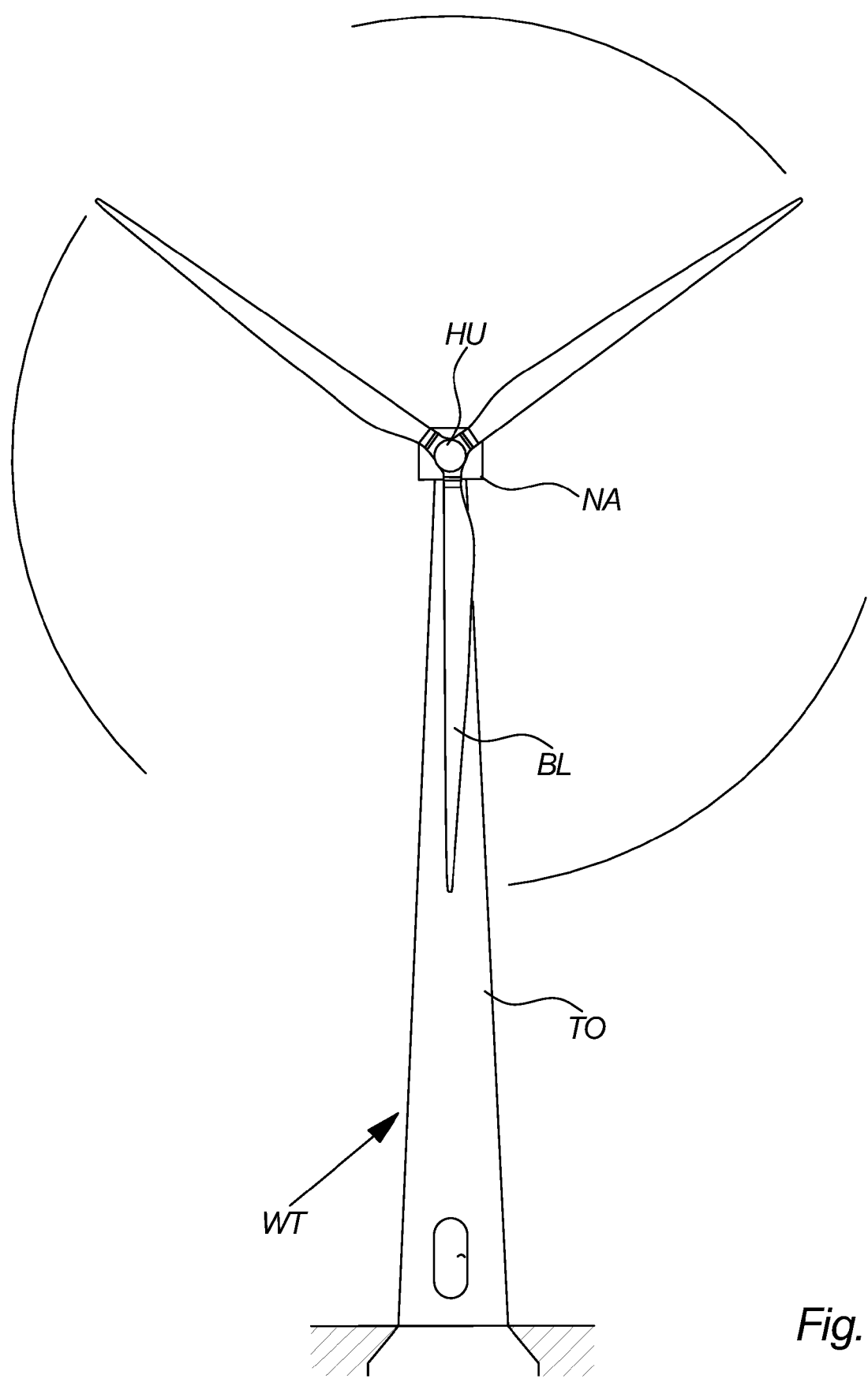
FIG. 1 illustrates a modern wind turbine.

The term "wind power system" is in accordance with an embodiment of the invention understood as a system related to the generation of power by means of the wind. A preferred example of a wind power system is a wind power plant WPP comprising a plurality of wind turbines WT and substations SUB, where control/monitoring units are comprised in a wind turbine WT and/or substation SUB. Hence, according to the invention, a system element of a wind power system could be any unit related to a wind power plant WPP or utility grid GD.

The term "data processor" DP may in accordance with an embodiment of the invention be understood as any arrangement or element that is related to processing of data. A data processor DP may be a controller or part of a controller e.g. in measurement equipment for measuring or monitoring of e.g. transformers, lightning, power, condition monitoring of physical elements of the wind power system, etc.

A data processor DP is understood as a unit using or referring to an external or internal clock in processing of data e.g. initiating measurements, activating actuators, comparing or calculating data. Examples of elements of a wind power system comprising one or more data processors DP may be wind turbine controller WTC, top controller TC, pitch controller PIC, hub controller HC, control unit for transformers, etc.

A data processor DP may physically be embodied in a PLC (PLC: Programmable Logic Controller), a DSP (DSP: Digital Signal Processor), a fuzzy logic computer, a biological computer, a neural logic computer or another hardware processing data. It should be noted that a data processor DP may also be understood as software which is dependent or independent on hardware when processing data.

The term "wind power plant" WPP is a term covering elements needed for a wind power plant WPP to produce energy. Such elements could e.g. be wind turbines WT, substation SUB, control units located internally or externally to the wind power plant WPP.

The term "wind turbine" WT is a term covering every unit internal or external to the wind turbine. Examples of such units could e.g. be measuring units for measuring wind speed, vibrations, output power, etc. or everything which is used in relation to wind turbines WT such as gear, generator, converter, aerodynamic control of blades such as pitch and flap mechanisms, etc.

The term "substation" SUB is a term covering everything included in a wind power plant WWP except for the wind turbines WT; hence, the term substation SUB may cover control units and servers, metrological equipment, phase compensation equipment, energy storage device, transformers, etc.

The term "jitter" is understood as unwanted variation of one or more characteristics of a periodic signals e.g. in electronics. Jitter may be seen in characteristics such as the interval between successive pulses, or the amplitude, frequency or phase of successive cycles. In other words jitter may be interpreted as an expression related to the precision of e.g. time between two clocks e.g. differences in time in data processors of the same time domain. Jitter is a determining factor e.g. for the simultaneity of samplings, measurements or activating actuators by data processors DP of the same time domain and for synchronizing of physical separated nodes in a network.

FIG. 1 illustrates a modern wind turbine WT. The wind turbine WT comprises a tower TO positioned on a foundation. A wind turbine nacelle NA with a yaw mechanism is placed on top of the tower TO.

A low-speed shaft extends out of the nacelle front or back and is connected with a wind turbine rotor through a wind turbine hub HU. The wind turbine rotor comprises at least one rotor blade BL e.g. three rotor blades BL as illustrated.

Figure 2:
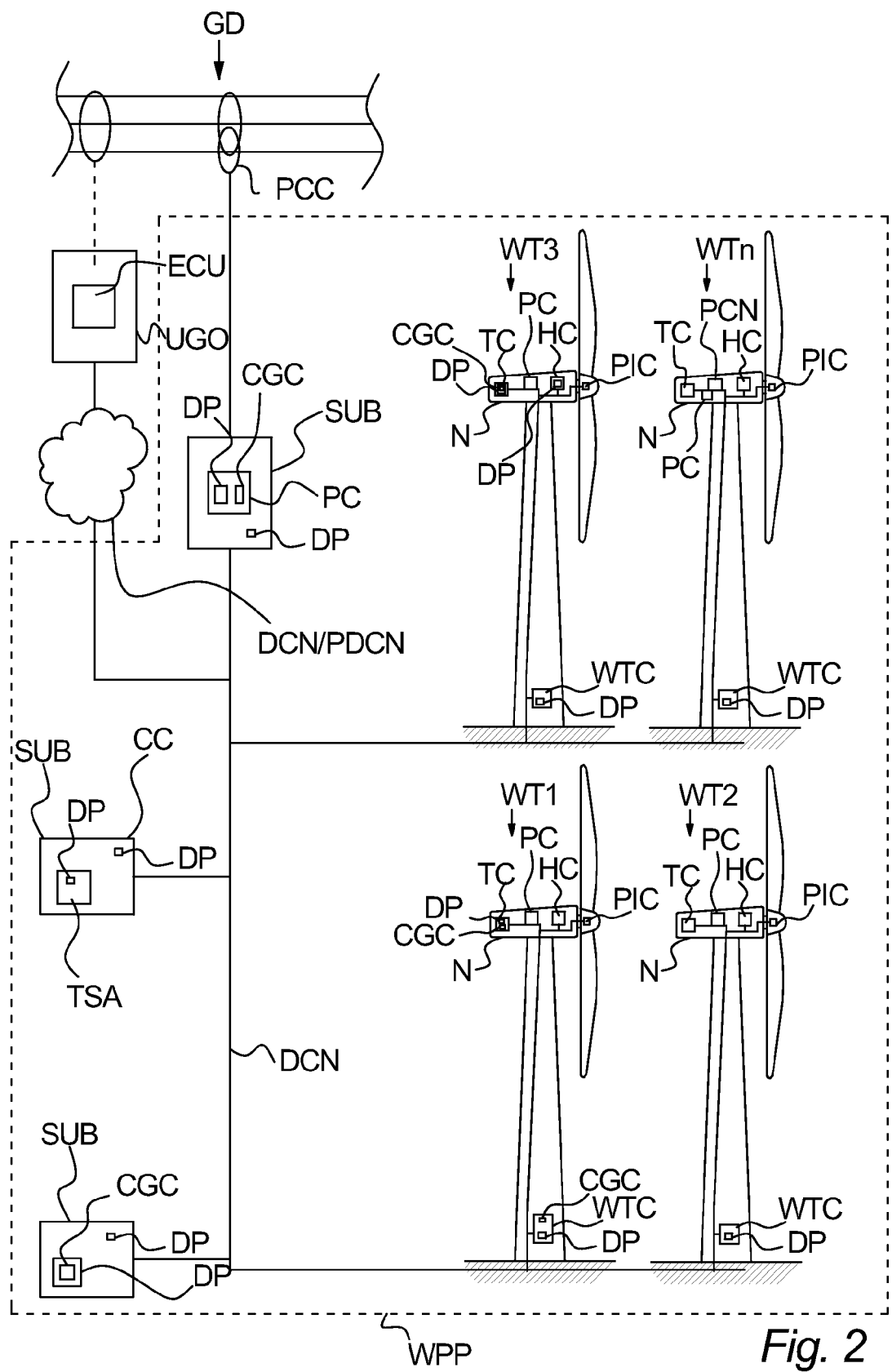
FIG. 2 illustrates a wind power plant.

FIG. 2 illustrates an overview of a typical wind power plant WPP, according to an embodiment of the invention. The illustrated wind power plant WPP comprises a number of wind turbines WT1-WTn located within a geographical area onshore or offshore. Furthermore, the wind power plant WPP may include one or more substations SUB e.g. metrological stations, filters, converters, capacitor banks, etc. The wind power plant WPP may be assembled to constitute a total unified power producing unit that can be connected to the utility grid.

A wind power plant WPP typically has a "master" or central controller CC. The central controller CC may, according to an embodiment of the invention, be located as part of or in relation to a SCADA (SCADA; Supervisory Control And Data Acquisition) server. The central controller CC may physically be located external to the wind power plant WPP or in relation to a substation SUB which may comprise a number of computers or processing units including data processors DP.

The central controller CC may typically comprise means for continuously controlling and monitoring the condition of the wind power plant WPP, including e.g. wind turbines WT and substations SUB. Furthermore, the central controller CC may collect data which may be used in statistics or analyses on operation and may at the same time send/receive control related data to and from elements of the wind power plant WPP.

The wind power plant WPP may communicate with external control units ECU e.g. located at a utility grid operator UGO or a support division in another country. The communication between the utility grid operator UGO and the wind power plant WPP e.g. in form of the central controller CC may be through a public data communication network PDCN such as the internet.

Within the wind power plant WPP, the central controller CC may be connected to the internal data communication network DCN connecting control and monitoring units of the wind turbine WT and substations SUB. The data communication network DCN within the wind power plant WPP may e.g. be a parallel or serial network implemented e.g. wireless or by means of optical or copper cables. Preferably, the data communication network DCN is a LAN (LAN: Local Area Network) or WLAN (WLAN: Wireless Local Area Network) and/or e.g. a part of a public data communication network PDCN, such as e.g. the internet or an intranet.

It should be mentioned that the network ecosystem also sometimes referred to as data communication network DCN of the wind power system may be fault-tolerant e.g. by redundancy in the network ecosystem. Such redundancy may be obtained by having double, triple or multiple communication paths within the network ecosystem.

A fault-tolerant network ecosystem may be understood as a data communication network DCN where the synchronisation of data processors DP may still be obtained even though a clock generating unit or a node such as a data processor DP in the data communication network DCN fails.

The redundancy may be implemented in the entire network ecosystem of the wind power system i.e. both at wind power system level e.g. between wind turbines WT, between wind turbines WT and substations SUB, etc. in the network ecosystem within the individual system elements of the wind power system e.g. between units of a wind turbine WT such as control and monitoring units, between units in a substation SUB, etc.

It should be understood that redundancy in the network ecosystem should also be understood as including redundancy between units comprised in a plurality of wind turbines WT and substations SUB.

The control related data may typically be data related to control of a wind turbine WT or substation SUB. The control related data may be instructions to a wind turbine WT or substation SUB e.g. to change the produced power (e.g. frequency or phase angle), activate or deactivate actuators, take measurements, pitch blades, etc.

The control of wind turbines WT and substations SUB is typically executed by control units such as e.g. pitch controller PIC, wind turbine controller WTC, substation controller, top controller TC, power converters PC, etc. all comprising one or more data processors DP. The data processors are typically associated with a clock generating circuitry CGC to obtain an internal clock signal also referred to as internal ticks IT. The data processors are able to process data, communicate, execute instructions, etc. according to the rising or falling edge of the internal clock or internal ticks IT.

The clock generating circuitry CGC also referred to as clock generating unit CU may be part of the data processor DP, a unit located within the data processor or a unit located external to the data processor DP. In the latter case more than one data processor may refer to the same clock generating circuitry CGC, typically this is the case when data processors are part of the same or neighboring data processing units. A data processing unit may according to the invention be a unit for carrying out instructions, measuring, controlling, etc.

With this said, it should be mentioned that in order to apply or increase the fault-tolerance of the internal clock signal within the network ecosystem it may be advantageously to build up a cluster of clock generating circuitries CGC. The effect of having a cluster of clock generating circuitries CGC is that if one of the clock generating circuitries CGC of such cluster fails, there is always a further clock generating circuitry CGC in the cluster to ensure an internal clock signal in the network ecosystem.

The data communication network DCN may also be utilized for transmitting monitoring data e.g. within a wind power plant WPP between substations SUB, wind turbines WT, controller units, etc. Furthermore, the data communication network DCN may be used to transmit monitoring data to and from the central controller CC, if the central controller CC is not located within the wind power plant WPP. Monitoring data may e.g. be a reading of a pressure, temperature, vibrations, wind speed, power output of the individual wind turbines WT or any other measured data within a wind power plant WPP. The measurements may be used later e.g. for statistic-, analytic- or control purposes.

The present invention is preferably utilized within a wind power plant WPP comprising a plurality of wind turbines WT and substations SUB but may be utilized within one single wind turbine WT or substation SUB.

Figure 3A:
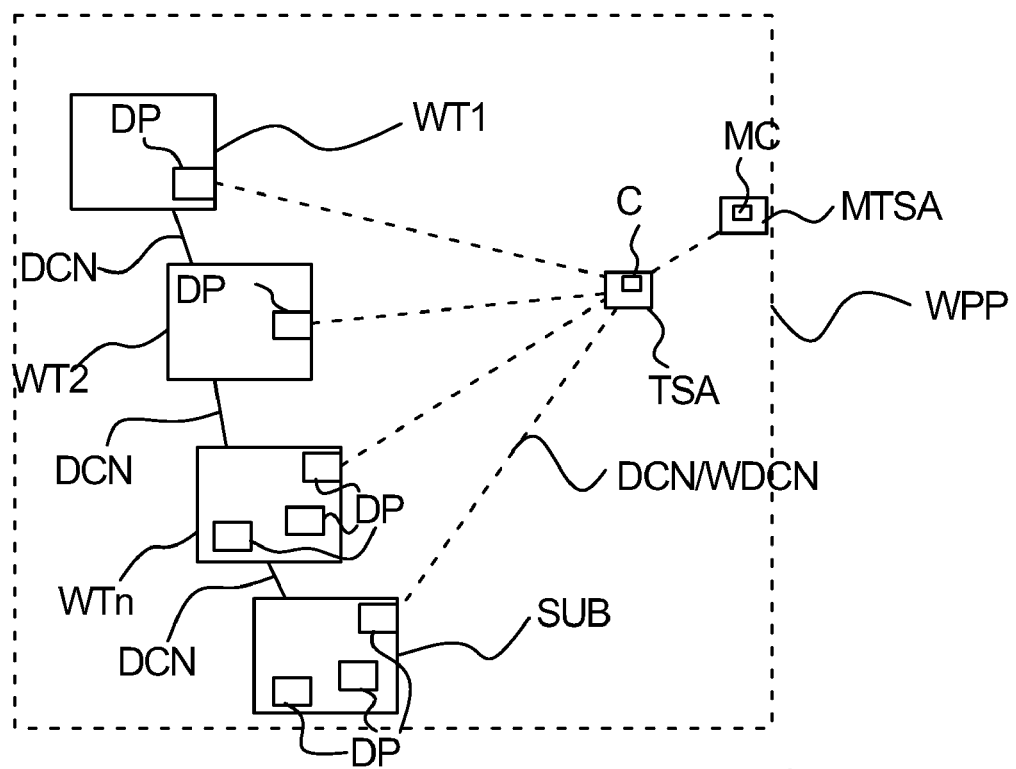
FIGS. 3a and 3b illustrate a data communication within a wind power plant according to an embodiment of the invention.

FIG. 3a illustrates a simplified overview of a wind power plant WPP including a number of wind turbines WT1-WTn and a substation SUB which are interconnected via a data communication network DCN. Evidently, other equipment may be present in a wind power plant WPP as described with reference to the description of FIG. 2. The illustrated wind turbines WT and substation SUB may comprise a plurality of internal data processors DP for processing data related to measure and control of the wind power plant WPP. At least part of the data processors DP are synchronized according to a precise time domain represented by a precise time originating from the time synchronizing arrangement TSA or master time synchronizing arrangement MTSA. The precise time is also referred to as precise time PT or reference signal throughout this document.

The precise time PT is handled or distributed from the time synchronizing arrangement TSA to the data processors DP by a precise time protocol such as IEEE-1588. The precision time protocol used to distribute the precise time PT ensures that the time domain in each of the wind turbines WT and substations SUB is as precise as the precise time PT. In other words data processors DP are able to synchronize their internal clock/internal ticks IT with the precise time PT of the time domain.

Alternatively the time synchronizing arrangement TSA or master time synchronizing arrangement MTSA may comprise a cluster of clock generations circuitries CGC from which the precise time PT originates and from which the precise time PT is distributed to relevant data processors DP via the data communication network DCN. According to this alternative way of creating a precise time PT or in combination with the use of a precise time protocol as described above the relevant data processors DP are able to synchronize their internal clock/internal ticks IT with the precise time PT.

As described above using a cluster of clock generating circuitries CGC introduces or increases the fault-tolerance of the precise time PT in the network ecosystem. In this way the precision of the precise time PT is maintained e.g. in a situation where one clock generating circuitry CGC fails. In such situations the relevant data processors DP may continue to synchronize their internal clock signal/internal ticks IT to the precise time PT.

The result of having a fault-tolerant precise time PT in combination with a fault-tolerant data communication network DCN as describes above is a network ecosystem of a wind power system comprising synchronous data processors even in situations where a clock generating circuitry CGC or a node in the data communication system fails.

It should be noted that the precise time domain does not have to be distributed to all wind turbines WT or substations SUB and that e.g. data processors DP of the wind power system may contribute with jitter so that the time domain e.g. in a wind turbine WT may not be completely identical with the time domain represented by the precise time PT.

Furthermore, it should be noted that a plurality of standards or protocols may be used to communicate a precise time PT to elements of a wind power plant WPP and that it may even be possible to develop a new protocol for this specific purpose. Besides the already mentioned IEEE-1588 it may be advantageous to use other precise time protocols or base development of new time synchronizing protocols on other protocols than IEEE-1588. Such protocols could e.g. include the IEEE-1588 with wireless protocol extensions, NTP (NTP; Network Time Protocol), SNTP (SNTP; Simple Network Time Protocol), etc. depending on the network.

Furthermore, it should be mentioned that many industrial real-time LAN protocols can be supported by a precision time such as e.g. POWERLINK™, EtherCAT™, ProfiNET™, etc. Furthermore, it should be mentioned that fault-tolerant clock generation and distribution can be supported by industrial real-time LAN protocols such as TTEthernet. It should be noted that some of the above-mentioned protocols or standards are proprietary.

A time synchronization arrangement TSA is illustrated in the wind power plant WPP in FIG. 3a where data processors DP of the wind turbines WT1-WTn, substations SUB may be connected to the time synchronization arrangement TSA via a data communication network DCN. The time synchronization arrangement TSA comprises at least one clock C from which the at least one precise time PT origins. The internal clock of at least part of the data processors DP of the wind power plant WPP is synchronized to this precision time PT and thereby at least one global precision time domain within the wind power plant is created.

It should be noted that elements outside the wind power plant WPP may also have access to the precise time and thereby the global precision time domain.

According to the invention, at least two time synchronization arrangements TSA or one time synchronization arrangement TSA and one master time synchronization arrangement MTSA is present in relation to the wind turbine plant WPP. This redundancy is a security measure if a defect should occur in one of the synchronization arrangements.

During operation in a master/slave configuration one clock C in one time synchronization arrangement TSA/MTSA is appointed as "master clock", hence, all other clocks C and data processors DP refers to the precise time PT originating from this "master clock". If the "master clock" fails, a clock C of one of the other time synchronization arrangements TSA takes over and produces the precise time PT. Which of the additional time synchronization arrangements TSA is taking over, may be determined in advance depending on the system.

During operation in a multiple master configuration two or more time synchronization arrangements TSA may form a network ecosystem in the data communication network DCN generating the precise time PT in mutual cooperation. Such time synchronization arrangements TSA may comprise clusters of clock generation circuitries CGC. If one time synchronization arrangement TSA fails e.g. if one clock generation circuitry CGC fails, the remaining time synchronization arrangements TSA in the ecosystem continue generating the precise time PT thus ensuring flawless generation of the precise time PT in single or multiple failure scenarios.

The same redundancy principle is preferably found in the distribution of the precise time PT in the data communication network DCN. Because it is important to the data processors DP to receive the precise time PT, a redundancy such as e.g. retransmission of the precise time may be performed to secure the precise time reaches the data processors DP expecting the precise time PT. In case the precise time PT fails to reach certain data processors DP this may affect the entire wind power plant performance.

Redundancy in the data communication network DCN may also be established in form of an additional data communication network, hence in case a fault such as e.g. a broken cable or defect network switch occurs in the data communication network DCN the precise time PT is transmitted to the data processors DP via the additional data communication network. Such additional data communication network could e.g. be a wireless, optical or wired network.

It should be noted that the precise time PT may be received centrally at e.g. a wind turbine WT and then via the internal LAN of the wind turbine WT be distributed to the data processors DP of the wind turbine WT.

The time synchronization arrangement TSA may be software or hardware implemented in the wind power plant e.g. as part of the central controller CC or as a stand-alone unit. The time synchronization arrangement TSA continuously communicates e.g. by distributing/broadcasting a precise time PT to at least part of the data processors DP within the wind power plant WPP. The precise time PT may be distributed via data communication networks DCN and methods as described above.

As described the precise time PT creates a time domain which at least a part of the data processors DP distributed e.g. in substations SUB and wind turbines WT of the wind power plant WPP refers to. The clock signal within these data processors DP is referring to the precise time PT from the time synchronization arrangement TSA. The time domain or clock signal of these data processors thereby becomes synchronous with the precision time signal PT, with a precision reflecting the precision of the precise time PT. Hence, an event occurring at the same time in different wind turbines WT may be registered in the respective wind turbines WT with a precise time stamp reflecting the precision of the precision time signal PT.

It should be noted that more than one synchronous time domain may refer to the same precision time signal PT.

It should furthermore be noted that a first synchronous time domain may refer to a first precise time PT, a second synchronous time domain may refer to a second global precise time PT, a N synchronous time domain may refer to a N global precision time signal PT, etc.

Each wind turbine WT and substation SUB may include several data processors DP as illustrated in FIG. 3a and a desired part of these data processors DP may be chosen to be synchronized. When the desired number of data processors DP of the wind power plant WPP is synchronized i.e. having a common understanding of the precision in the precise time PT, it is possible to perform a very precise and reliable control and analysis e.g. comparison of specific events or effect of events occurring in the wind power system.

Figure 3B:
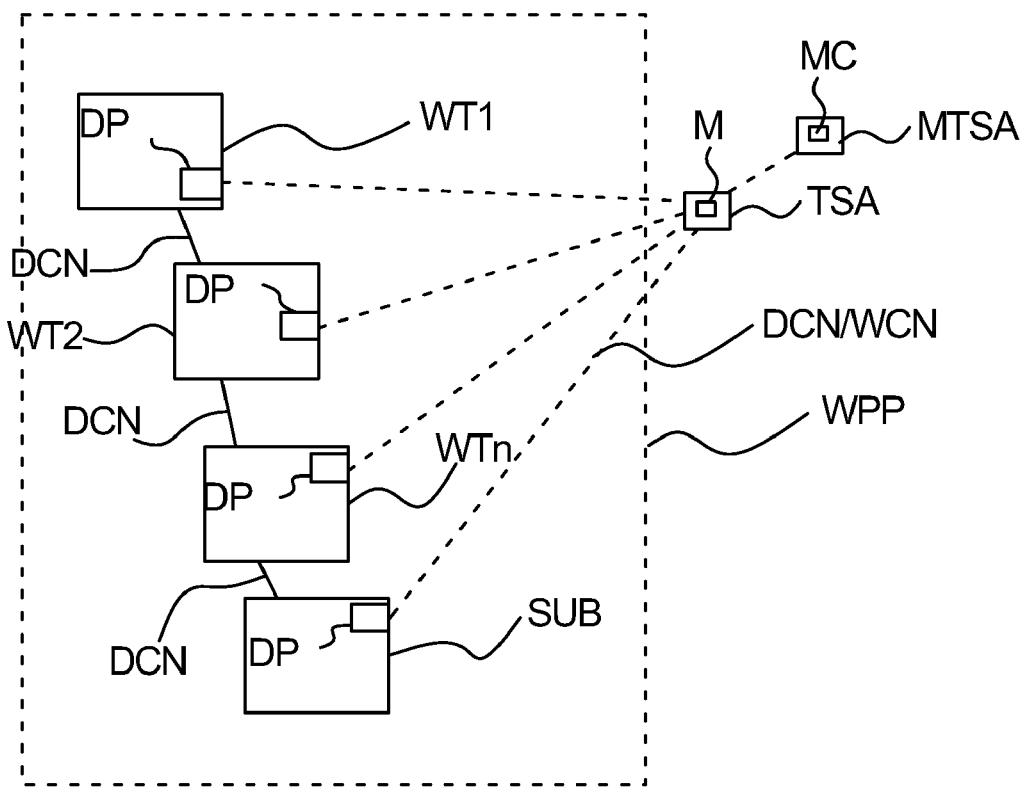

FIG. 3b illustrates a wind power plant WPP where the time synchronization arrangement TSA is located externally from the wind power plant WPP.

The external located time synchronization arrangement TSA may be communicated to elements of the wind power plant WPP e.g. via a wireless data communication network WDCN, earth satellite system such as a GPS, or preferably through an existing data cable/fiber data communication network.

The synchronization of time between the data processors DP of the elements of the wind power plant WPP illustrated on FIG. 3b may be established as described in relation to FIG. 3a. Hence, the precise time PT from the synchronization arrangement TSA may be independent of existing internal time signals of the wind power plant WPP and thereby the precise time PT becomes a reference signal.

It should be noted that it may not be relevant to synchronize all data processors DP of e.g. a wind turbine WT or substation SUB. Furthermore is should be noted that the data processors DP is distributed within elements of the wind power system (also referred to as system elements) so that one system element may comprise a plurality of data processors while another system element comprises only a few data processors or even none at all.

Figure 3C:
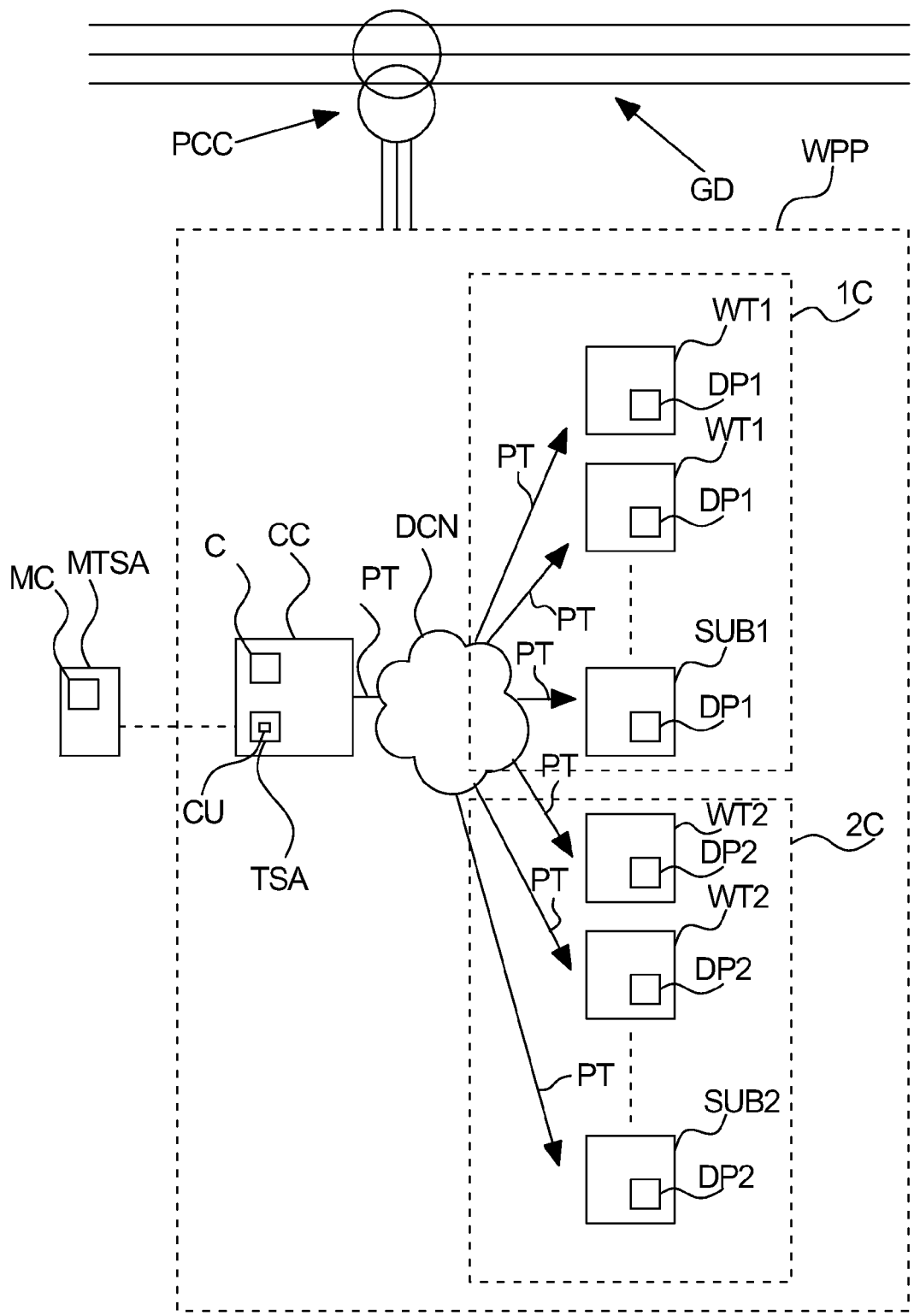
Figure 3D:
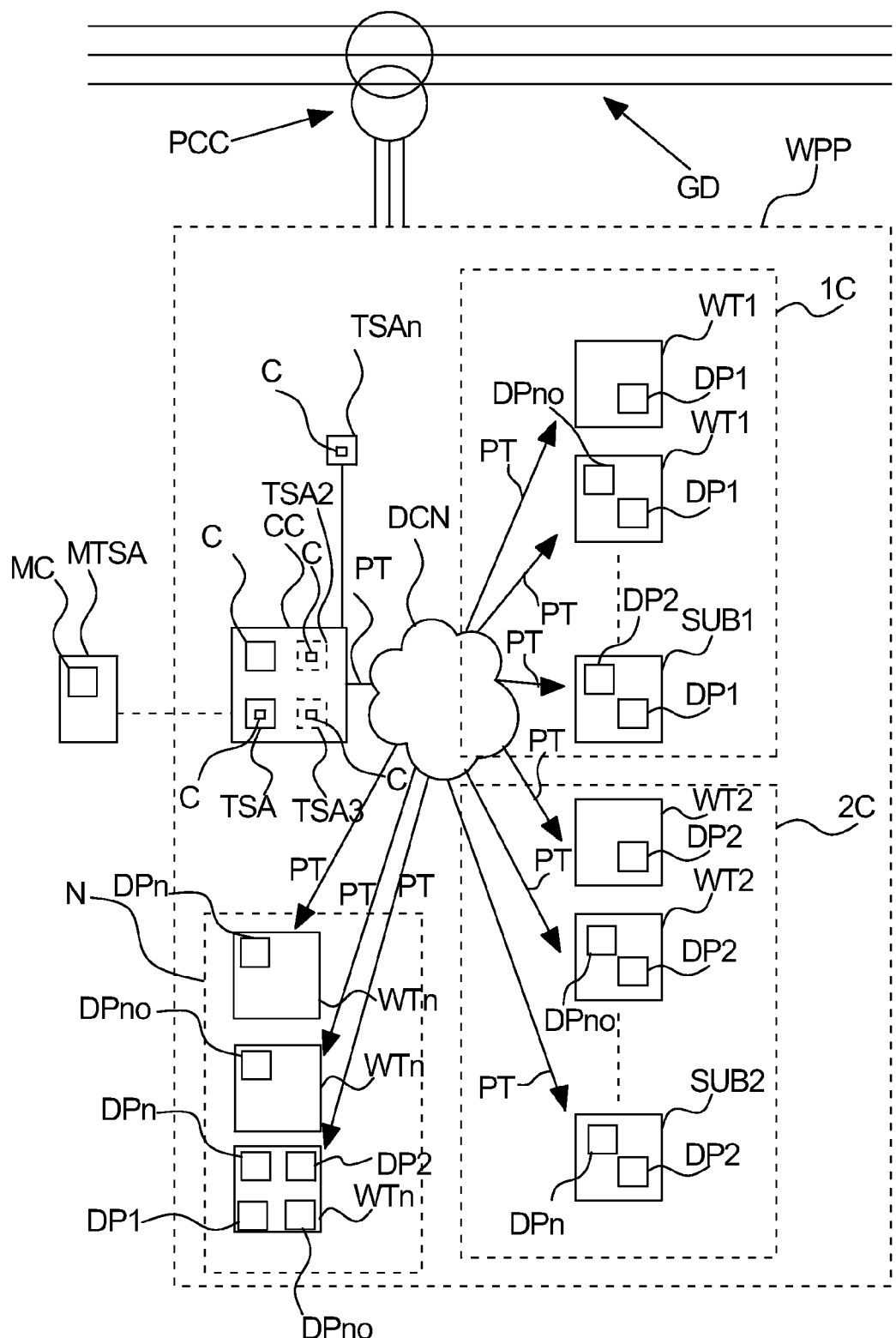

FIGS. 3c and 3d illustrate a wind power plant WPP with two groups of wind turbines WT1, WT2 and a precision time synchronization arrangement TSA. The wind power system may include an internal or external master time synchronization arrangement MTSA to which one or more of the time synchronization arrangements TSA refer to.

The time synchronization arrangements TSA may comprise one or more clock generating units CU or be slave to a master clock MC from a master precision time synchronization arrangements MTSA. The master precision time synchronization arrangement MTSA may be located within the wind power plant WPP or as illustrated in FIG. 3a external to the wind power plant WPP.

In case the time synchronization arrangements TSA comprises more than one clock generating unit CU or clock generating circuitry CGC these clock generating units CU may form one or more clusters of clock generating units CU within the time synchronization arrangements TSA. Hence such time synchronization arrangement TSA becomes fault-tolerant because if one clock generating circuitry CGC fails, another clock generating circuitry CGC of the cluster ensures the functionality of the time synchronization arrangement TSA.

Furthermore when such fault-tolerant time synchronization arrangements TSA is connected in a data communication network DCN such network becomes fault-tolerant i.e. the time synchronization arrangements TSA then forms a fault-tolerant network ecosystem. In such network ecosystem the plurality time synchronization arrangements TSA comprising clusters of clock generating units CU are compensating each other in case of fault in one time synchronization arrangement TSA, thereby ensuring that the time synchronization arrangements TSA always are able to create and distribute a precise time PT.

The data processors DP1, DP2 of the illustrated wind turbines WT1, WT2 and substations SUB1, SUB2 are synchronized according to at least one precise time PT originating from the time synchronization arrangement TSA or the master time synchronization arrangement MTSA.

According to an embodiment of the invention, the precise time PT is global in the sense that all elements of a wind power system such as the illustrated wind power plant WPP have access to the precision time signal PT. Even not illustrated external wind power systems communicating with the illustrated wind power plant WPP may also have access to the precision time signal PT.

The data processors DP1, DP2 are synchronized to the global precision time domain based on performance/characteristics of the data processors DP1, DP2.

In the wind power plant WPP illustrated on FIG. 3c, data processors DP1 of a second category 2C comply with the precision and e.g. also frequency of the precise time PT. This is contrary to the data processors DP1 of a first category 1C which do not comply with the precision of the precise time PT. Therefore, the full potential of the precise time PT cannot be utilized in relation to the data processors DP1. It should be noted that the precise time PT may still be used to synchronize data processors DP1 but the precision of data processors DP1 cannot be better than the precision of the hardware and/or software of data processor DP1. See further explanation of precision in relation to the description of FIG. 4a-4g.

By synchronizing data processors DP2 of elements of the second category 2C based on a precise time PT from time synchronization arrangement TSA measurements may be obtained with a precision reflecting the precision of this precise time PT. In relation to measurements it should be noted that measurements may be time stamped with a time and date which may in post-analysis be valuable information.

Such measurements may e.g. be used in statistics or analyses e.g. of performance of a wind turbine or fault distribution in a wind power system, testing of e.g. a wind turbine, as basis for controlling the wind turbine, etc.

The illustrated wind power plant WPP comprises a plurality of data processors DP1, DP2 which may be categorized according to the performance e.g. precision of the data processors. In the embodiment illustrated on FIGS. 3c and 3d the data processors DP1, DP2 are divided into a first category 1C and a second category 2C.

It should be noted that, according to the invention, it is possible to have a plurality of categories and that not all data processors have to be categorized. The categories first 1C and second 2C are used to distinguish between data processors capable of meeting different requirements in relation to precision. Hence, second category 2C data processors DP2 may process data more precisely than first category 1C data processors DP1.

Categorizing of data processors DP in wind power plants WPP is advantageous e.g. in relation to wind power plant control. This is because today's wind power plants and wind turbines are dynamical in the sense that new wind turbine models are developed, control units of existing wind turbines are replaced with new control units, existing wind power plants are expanded so that different wind turbine models or even wind turbines from different manufacturers are located within the same wind power plant. Therefore, within the same wind power plant or wind turbine, data processors capable of meeting different precision requirements are used.

Typically, at the time a wind turbine is erected, data processors of such new wind turbine would be fast and precise and therefore according to the example above part of the second category 2C data processors DP2. If such a wind turbine is added to an existing wind power plant with wind turbines having first category 1C data processors DP1, this wind power plant WPP would comprise data processors DP1, DP2 of both categories.

The same is applicable for an existing wind power system comprising a control element where data processors of such a control element would be first category 1C data processors DP1. If such a control element is replaced with a new control element e.g. because of defects, data processors DP2 in the new control element would typically be of the second category 2C. Hence, the existing wind turbine would then comprise both first category 1C data processors DP1 and second category 2C data processors DP2.

Of course the categorizing of data processors into e.g. a first and second category 1C and 2C does not solely depend on whether a data processor is replaced or not. A new wind turbine may comprise data processors of different precision; hence, data processors of a wind power plant comprising all new wind turbines may also be categorized into more than one category.

Preferably it is the manufacturing date of the data processors, version of firmware; performance, etc. which decides to which category the data processor belongs. According to an embodiment of the invention, the categorization into one or more categories of data processors may be done manually by selecting the desired data processors of a wind power system and testing or by look-up tables defining the category of this data processor.

The control of a wind power system as described above having both first and second category 1C, 2C data processors DP1, DP2 could be optimized by using differentiated control of the wind power system. Where the data processors of the wind power system may be controlled based on which category the data processors belongs to.

It should be noted that the control of a wind power plant WPP according to the invention having more than one category of synchronized data processors may be controlled completely as a wind power plant WPP without categorization of synchronized data processors. The categorized and synchronized data processors may lead to controlling the wind power plant according hereto and at least in certain situations this may be advantageous. This is e.g. because precise measurements may be obtained synchronous in a plurality of wind turbines e.g. for control or analysis, activating actuators fast and precise e.g. in relation to reduction of mechanical stress, respond and analysis on faults within the wind power plant or from the grid, park wide control of energy production e.g. to be able to support the grid with reactive power in case of voltage drop, noise, etc.

As illustrated on FIG. 3c the wind power plant WPP is connected to the grid GD. The wind power plant WPP comprises wind turbines WT1 of the first category 1C and wind turbines WT2 of the second category with data processors DP1 and DP2, respectfully. Therefore, it is possible to perform time critical control of and measurements on elements of the second category 2C more precisely than similar control and measurements on elements of the first category 1C.

In wind power plants WPP as illustrated on FIG. 3c faults such as short cut, stroke of lightning, grid fault, etc. may occur.

If a grid disturbance (event or fault), resulting in e.g. a change to the amplitude or frequency of the fundamental voltage on the grid, occurs in the grid GD, some or all power converters in the wind power plant WPP may be able to support the grid GD with highly synchronized control of e.g. increased or decreased active or reactive power. The wind power plant WPP has to react rapidly and precisely upon detection of disturbance in the grid voltage, preferably within one period of the frequency of the fundamental voltage on the utility grid, i.e. faster than 10-15 ms. Preferably disturbances in the grid voltage are measured at the point of common coupling PCC.

In an embodiment of the invention the wind turbines WT2 of the second category 2C comprises date processors DP2 with jitter less than 0.5 microsecond and at the same time these data processors DP2 may be able to process data faster than 1 microsecond. This should not necessarily be understood literal, the second category 2C data processors DP2 may also simply enable activation of one or more control outputs at a precise point in time with reference to the precise time PT. Hence the second category 2C data processors DP2 is able to finish processing of e.g. a control output in due time before activation and this does not necessarily entail execution or processing of data faster than one microsecond.

It should be noted that the mentioned jitter in the data processor may be the total jitter occurring from different sources such as clock generating circuitry CGC, thermal heat, latencies in electrical or mechanical structure of the data processor, etc.

Another example of the advantages in having a group of fast and precise data processors which can be controlled individually from other data processors is in case of tracking the origin of a fault in the wind power plant WPP.

If the data processors DP2 of wind turbines WT2 of the second category 2C have a data processing speed which is faster and a precision which is better than the distribution of a fault occurring within a wind power plant WPP, it is possible to log time, data and other parameters when the fault is detected in each wind turbine WT2 and thereby a better opportunity to analyze and learn from such fault is obtained. Hence, in the first wind turbine the fault is registered at time T0, in the neighboring wind turbines at T1, and soon.

It should be noted that the term data processing includes both software and hardware processing of data. In situations where e.g. a precise high speed time stamping of data is required, it may be preferred to execute such precise high speed time stamp by hardware.

Another example of the advantages in having a group of fast and precise data processors DP2 which can be controlled individually from other data processors DP1 is in situations where a wind turbine WT has to be decoupled from the power producing part of the wind power plant WPP. It is preferred to do so when the sinusoid output from the wind turbine WT is zero to minimize emission of noise due to the decoupling of the wind turbine WT. The decoupling may be controlled by the power converter PC within the individual wind turbine WT and according to the invention with a precision reflection the precise time PT.

Furthermore it should be noted that because of the precise reference signal it may be possible to predict the characteristics of emitted noise, e.g. harmonics on a sinusoidal signal, and thereby use the power converters PC to shape harmonics on a sinusoidal signal which are compensating harmonics occurred in other wind turbines WT in the wind power plant WPP.

Another example of the advantages in having a group of fast and precise data processors which can be controlled individually from other data processors is in control of the sinusoidal power output form a wind turbine WT. The sinusoidal output is shaped by the power converter PC and depending on time of switching of the switches the frequency, phase angle, amplitude, etc. of the output can be controlled.

In the wind power plant WPP illustrated in FIG. 3d the data processors are divided in a plurality of categories (1, 2, ..., n) of data processors DP1, DP2, ..., DPn and illustrated also is data processors which are not categorized DPno. The different categories comprise data processors with different characteristics e.g. from high precision data processors DP2 in category 2 2C to the data processors DPno which is not categorized e.g. based on poor precision.

The elements, such as wind turbines WT and substations SUB of the wind power plant WPP; each comprises data processors from different categories.

It should be noted in relation to FIGS. 3c and 3d that more than one reference signals also referred to as precise time PT or clock signal may be distributed within the wind power plant WPP and may be used as basis for control and synchronization of data processors. In the same way non-categorized data processors and data processors from different categories may all use the same reference signal such as the precise time PT or other clock signals.

Furthermore, it should be mentioned that if data processors are categorized based on other parameters than precision, the same data processor might be in more than one category. The same data processor might then be both in one category defining very precise data processors and a further category defining data processors processing data with a very high frequency. In this situation the central controller CC of the wind power plant WPP may, as response to a grid fault, control the wind turbines by using one or more of the categories of data processors.

The categorizing of data processors according to the invention as described above may be done by sending a signal from the central controller CC to the data processor which precision needs to be found and then use information in/from a response from the data processor to categorizing.

Another method of categorizing the data processors in existing wind power systems could be a computer with software developed to test the data processor connected to the data processor and thereby testing and obtaining information of the data processor.

When replacing a unit comprising a data processor, the unit with the new data processor may be tested before installing it in the wind power system.

The above methods may of course be supplements to the manufacturer's information of the performance of the data processor when categorizing the data processors.

It should be noted that the characteristics such as precision of the data processors, for categorizing the data processors, may also be found by other methods than described above.

It should be noted that the synchronous data processors may be used to synchronize aviation light.

FIG. 4a-4g illustrates what is understood as jitter and precision according to the invention, by means of the illustrated signals extending in the time.

In a data communication channel such as a data communication network DCN, propagation delay occurs because of the physical distance between the time synchronization arrangement TSA and the data processors DP. Hence, from the time the precise time PT is transmitted from the time synchronization arrangement TSA to the time it is registered at a data processor DP a delay occurs.

To align such delay and thereby obtain a time domain in the data processors, in phase with the precise time PT from the time synchronization arrangement TSA, a time protocol such as e.g. IEEE-1588 may be used to distribute the precise time PT.

Whether time protocol IEEE-1588, a new developed time protocol or a cluster of clock generating circuitries CGC is used, the time protocol may comprise built-in mechanisms for aligning the phase or time of the internal ticks of each data processor with the precise time signal.

Such mechanisms may depend on the used protocol and may be software as well as hardware supported, where the hardware supported mechanisms typically is the most precise. In one example, software supported mechanisms may ensure a precision better than ±100 µs and hardware supported mechanisms better than ±100 ns.

Based on the signals illustrated in FIG. 4a-4h the understanding of jitter in relation to the present invention is described. Jitter in a data processor is, according to the present invention, understood as a time-varying displacement of the rising or falling edges of the internal clock of the data processor DP compared with the rising or falling edges of the desired ideal clock e.g. the precise time PT signal from the time synchronization arrangement TSA or a clock derived from it. Accordingly, the length of two adjacent clock periods is varying which is why this jitter is sometimes also referred to as cycle-to-cycle jitter.

The Unit Interval is often used for defining the jitter, and does so by defining the jitter of a clock in a data processor in terms of a fraction of the ideal clock to which the data processor clock is synchronized.

FIG. 4a illustrates one definition of an allowable unit interval in relation to one period of a clock signal e.g. the internal clock or ticks of a data processor DP. Jitter in the illustrated clock signal may occur within the hatched area J, hence, allowable jitter in relation to this clock signal is ⅛ of the period signal.

Of course jitter may also be defined by absolute units such as e.g. micro-, nano- or picoseconds or in terms of degrees or radians.

It should be underlined that the signals illustrated throughout FIGS. 4a-4h are for illustrative purpose only and therefore in relation to other signals a period may e.g. be from transition to transition. Furthermore, the size of the illustrated jitter is very large compared to the illustrated signals and because the FIGS. 4a-4h is for illustrative purposes only.

In FIGS. 4a-4h the jitter J, J1, J2, JPT, JDP, JS, JF is illustrated schematically as a hatched area which might indicate that the illustrated jitter is deterministic. This may also be the case, but often the jitter occurs randomly in a Gaussian distribution centered around the expected ideal edge of the clock signal.

The signals PT, IT, IT1, IT2 illustrated on FIG. 4a-4d are all in phase, hence, the first edges of the mentioned signals are all at time T0, second edge at time T1, etc. Again this is for illustrative purposes; the signals IT, IT1 and IT2 referring to the precise time signal PT may be divided so that the frequency of these signals are lower than the frequency of the precise signal PT. Also the signals IT, IT1 and IT2 may be a multiplication of the precise signal PT resulting in a frequency higher than the precise signal PT.

FIG. 4b illustrates a precise time PT originating from the time synchronization arrangement TSA; hence, this precise time PT may be interpreted as a global master clock to which the internal clocks/internal ticks of the data processors DP are synchronized. The precision time signal PT is here illustrated as an ideal signal without jitter.

FIG. 4c illustrates a signal representing the internal clocks or ticks IT of a data processor DP. As described above, the precise time PT from the time synchronization arrangement TSA and the precise time protocol ensures that the precise time PT and the internal ticks IT are synchronized and in phase.

The reference signal is created based on the precise time protocol can be said to control jitter due to its ability to establish a low jitter global precise time PT in a wind power system, but the reference signal cannot remove jitter entirely because the data processors run with separate internal clocks that are not in phase.

Therefore what cannot be controlled by the time protocol is jitter occurring in the data processors e.g. in relation to the rising edge of the internal tick IT which according to the illustrated example is expected simultaneously with the rising edge of the precise time PT from FIG. 4b. In FIG. 4c jitter occurs twice; at time T2 and T5. Because of the illustrated jitter, the rising and falling edges at T2 and T5 are not synchronous with the edge on the precise time PT illustrated in FIG. 4b. The hatched areas J between the time where the rising edge was expected T2 and the time the rising edge actually occurred T2J is uncertainty introduced by the data processor and this is defined as jitter occurring in the data processor. Hence, the precision of control or measurement initiated by this data processor cannot be more precise than jitter allowed in the data processor.

FIG. 4d illustrates the precision of the internal tick IT2 of data processors of the second category 2C and FIG. 4e illustrates the precision of the internal tick IT1 of data processors of the first category 1C. Again it should be remembered that the ratio between jitter and period (unit interval) is illustrated as very large compared to unit interval in data processors used in wind turbines.

FIGS. 4d and 4e illustrate requirements to be met by data processors of the first category 1C and the second category 2C, respectfully. Data processors of the second category 2C have to be more precise (less jitter) than data processors of the first category 1C. This is illustrated by the fact that the area J2 defining allowable jitter of data processors of the second category 2C is less than the area J1 defining allowable jitter in data processors of the first category 1C.

FIG. 4f illustrates the effect of synchronizing a data processor DP with a poor precision with a precise time PT having a high precision. In this situation the limit for jitter in the output signal reflects the limit for jitter in the data processor DP because jitter in the precise time signal PT is very small compared to the jitter in the data processor DP and can therefore be ignored. Hence, even though a high precision signal is fed to the data processor DP, the data processor DP is not capable of utilizing the full potential of this precise signal when processing data, initiating control or measurements, etc.

This is illustrated in FIG. 4f. The area JPT representing the allowed jitter in the precise time PT is smaller than the area JDP representing the allowed jitter in the output signal OS from the data processor. If the allowed jitter in the data processor DP is larger than the allowed jitter in the precise time PT, the jitter in the output signal OS is determined by the allowed jitter in the data processor DP.

Accordingly, if the allowed jitter in a data processor was less than the allowed jitter in the precise time PT, the precise time PT was determining for the jitter in the output signal OS.

In the situation where jitter in the precise time signal PT and in the data processor DP cannot be ignored the worst case resulting jitter can be an addition of jitter in the precise time signal PT and jitter in the data processor PD.

According to an embodiment of the invention, the frequency of the precise time signal, internal ticks of the data processors, etc. may remove the focus on jitter. FIG. 4g illustrates a low-frequency signal LFS with almost no jitter JS and FIG. 4g illustrates a high-frequency signal HFS with no requirements to jitter JF, both signals may represent internal ticks in a data processor.

Even though the result is that jitter JF allowed in the signal LFS illustrated in FIG. 4h is larger than jitter JS allowed in the signal HFS illustrated in FIG. 4g, the data processor having the internal ticks illustrated in FIG. 4h may process data, initiate control or measurements more precisely than the data processor having the internal ticks illustrated on FIG. 4g. Simply because there are so many rising edges in the high-frequency signal HFS that even with the large jitter JF more periods occur than in the low frequencies. Thereby it is possible for the data processor using the high-frequency signal HFS to initiate e.g. control or measurements more precisely or closer to the desired point in time of control or measure than the data processor using the low-frequency signal LFS with less periods.

When a control instruction is to be carried out at the same time in a plurality of data processors, it is preferred to have precise internal ticks inside the data processor because the less jitter the more synchronous the control is carried out by the plurality of data processors.

When a measurement is to be registered in a plurality of wind turbines e.g. to locate a fault, it is preferred to have a fast signal even though this signal has a large jitter. This is because the fast non-precise data processor has more edges on which measurements can be registered than the slow precise data processor.

It should be noted that in practical use data processors with low jitter is preferred to process data relating to time critical control and measurement.

In relation to the above, it should be mentioned that a large or a small jitter is referred to in the time; hence, a large jitter would typically be understood as many microseconds relative to the time of one period of the signal.

It should be mentioned that anti-jitter circuits may be designed to reduce the level of jitter in the internal clock of a data processor, to make a data processor DP able to comply with precision demands, which was not otherwise possible. An anti-jitter circuit may operate by re-timing the output pulses so they align more closely to an idealized pulse signal, examples of anti-jitter circuits include phase-locked loops, delay-locked loops, etc. Furthermore, different uses of buffers may be used to reduce the level of jitter.

According to the invention the embodiments described in relation to the figures illustrated in FIGS. 1-4*h* can be combined in any combination.

The invention claimed is:

1. A method of controlling a wind power system comprising a plurality of system elements, said wind power system including a plurality of data processors distributed in said system elements, the method comprising the steps of:
   synchronizing at least a part of said data processors to at least one reference signal distributed to said data processors from a time synchronization arrangement,
   associating said data processors with local clock generation circuitries,
   wherein said local clock generation circuitries associated with data processors of a first subset of the data processors have a peak-to-peak tracking jitter higher than or equal to a predetermined threshold value,
   wherein said local clock generation circuitries associated with data processors of a second subset of the data processors have a peak-to-peak tracking jitter less than said predetermined threshold value,
   controlling at least one of said system elements at least partly by means of a data processor from said first subset of data processors susceptible to the jitter of the local clock generation circuitry associated with the data processor from the first subset of data processors, and
   controlling at least one of said system elements at least partly by means of a data processor from said second subset of data processors on the basis of said at least one reference signal while being susceptible to the jitter of the local clock generation circuitry associated with the data processor from the second subset of data processors,
   thereby utilizing said second subset of data processors for high precision control in the wind power system.

2. The method of controlling the wind power system according to claim 1, wherein said second subset of data processors are utilized for high precision control of power converters of energy storage devices of the wind power system.

3. The method of controlling the wind power system according to claim 1, wherein said second subset of data processors are utilized for high precision control of power converters of wind turbines or substations of the wind power system.

4. The method of controlling the wind power system according to claim 1, wherein high precision control of power converters enables wind turbine controllers and substation controllers to adjust the phase of respective pulse width modulators relatively to the reference signal.

5. The method of controlling the wind power system according to claim 1, wherein said second subset of data processors are utilized for high precision control of data acquisition within the wind power system.

6. The method of controlling the wind power system according to claim 1, wherein said predetermined threshold value is within the range of 0.1 microseconds to 10 microseconds.

7. The method of controlling the wind power system according to claim 1, wherein the local clock generation circuitries associated with data processors of the first subset of the data processors have a peak-to-peak cycle-to-cycle jitter higher than or equal to said predetermined threshold value and
   wherein the local clock generation circuitries associated with data processors of the second subset of the data processors have a peak-to-peak cycle-to-cycle jitter less than said predetermined threshold value.

8. The method of controlling the wind power system according to claim 1, wherein said data processors are part of a wind turbine controller, a substation controller or a central controller of a wind power plant.

9. The method of controlling the wind power system according to claim 1, wherein a time represented by said reference signal is precise to the nearest microsecond.

10. The method of controlling the wind power system according to claim 1, wherein a data processor from said first subset of the data processors is synchronized to a derivative of said reference signal.

11. The method of controlling the wind power system according to claim 1 wherein said predetermined threshold value is within the range of 0.1 microseconds to 2 microseconds.

12. The method of controlling the wind power system according to claim 6 wherein a percentage predetermined threshold value is within the range of 0.1% to 10% of the period of a clock generated by said local clock generation circuitries.

13. A system for controlling a wind power system comprising a plurality of system elements, said wind power system including a plurality of data processors distributed in said system elements, comprising:
   a synchronizer for synchronizing at least a part of said data processors to at least one reference signal distributed to said data processors from a time synchronization arrangement,
   an associator for associating said data processors with local clock generation circuitries,
   wherein said local clock generation circuitries associated with data processors of a first subset of the data processors have a peak-to-peak tracking jitter higher than or equal to a predetermined threshold value,
   wherein said local clock generation circuitries associated with data processors of a second subset of the data processors have a peak-to-peak tracking jitter less than said predetermined threshold value,
   a first controller for controlling at least one of said system elements at least partly by means of a data processor from said first subset of data processors susceptible to the jitter of the local clock generation circuitry associated with the data processor from the first subset of data processors, and a second controller for controlling at least one of said system elements at least partly by means of a data processor from said second subset of data processors on the basis of said at least one reference signal while being susceptible to the jitter of the local clock generation circuitry associated with the data processor from the second subset of data processors, thereby utilizing said second subset of data processors for high precision control in the wind power system.

14. The method of controlling the wind power system according to claim 6 wherein said predetermined threshold value is within the range of 0.1 microseconds to 2 microseconds.

15. The method of controlling the wind power system according to claim 6 wherein said predetermined threshold value is within the range of 0.35 microseconds to 0.65 microseconds.

16. The method of controlling the wind power system according to claim 12 wherein the percentage predetermined threshold value is within the range of 0.2% to 3% of the period of the clock generated by said local clock generation circuitries.

17. The method of controlling the wind power system according to claim 12 wherein the percentage predetermined threshold value is within the range of 0.5% to 1.5% of the period of the clock generated by said local clock generation circuitries.

* * * * *